US007870037B2

(12) United States Patent
Stephens et al.

(10) Patent No.: US 7,870,037 B2
(45) Date of Patent: Jan. 11, 2011

(54) METHOD FOR GRAPHICALLY PRESENTING AUCTION INFORMATION

(75) Inventors: Dave Stephens, Half Moon Bay, CA (US); Ngai-Ming Wang, Fremont, CA (US); Drew Gallant, San Francisco, CA (US); Manish Srivastava, San Carlos, CA (US); Wei Chen, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1835 days.

(21) Appl. No.: 10/185,188

(22) Filed: Jun. 27, 2002

(65) Prior Publication Data

US 2009/0091572 A1  Apr. 9, 2009

(51) Int. Cl.
*G06F 17/30* (2006.01)
(52) U.S. Cl. .............................. 705/27; 705/26; 705/37
(58) Field of Classification Search ............... 705/26, 705/27, 37
See application file for complete search history.

(56) References Cited

U.S. PATENT DOCUMENTS

| 6,101,484 | A  * | 8/2000  | Halbert et al. ........... 705/26 |
| 6,269,343 | B1 * | 7/2001  | Pallakoff ................ 705/26 |
| 6,366,891 | B1   | 4/2002  | Feinberg |
| 6,907,405 | B2 * | 6/2005  | Brett ..................... 705/37 |
| 7,330,826 | B1 * | 2/2008  | Porat et al. ............. 705/26 |
| 7,340,428 | B1 * | 3/2008  | White et al. ............ 705/37 |
| 7,401,034 | B1   | 7/2008  | Srivastava et al. |
| 7,533,051 | B2   | 5/2009  | Powell et al. |
| 7,536,319 | B2   | 5/2009  | Thakur et al. |
| 2001/0029506 | A1 * | 10/2001 | Lee et al. ............ 707/102 |
| 2002/0042769 | A1 * | 4/2002  | Gujral et al. .......... 705/37 |
| 2002/0095369 | A1 * | 7/2002  | Kaplan et al. ......... 705/37 |
| 2003/0074298 | A1 * | 4/2003  | Daum ................... 705/37 |
| 2009/0112726 | A1   | 4/2009  | Miller et al. |
| 2009/0112772 | A1   | 4/2009  | Powell et al. |

OTHER PUBLICATIONS

Nossaman: "Infrastructure Update: New Design-Build Legislation Targets School Construction," Nossaman Authored Articles, Nov. 26, 2001, 4pg.*

* cited by examiner

*Primary Examiner*—Robert M. Pond
(74) *Attorney, Agent, or Firm*—Townsend and Townsend and Crew LLP

(57) ABSTRACT

A method for graphically presenting auction information. Characteristics of an auction for an item are received, wherein the characteristics comprise a target price for the item and a close time of the auction. The auction is then published to at least one bidder. At least one bid is received at a bid time, wherein the bid comprises a price for the item. A graphical presentation of status of the auction is generated, presenting auction information. The graphical presentation comprises a first axis and a second axis, wherein the bid is plotted as a point within the graphical presentation where the first axis corresponds to the bid time and the second axis corresponds to the price. New bids received are automatically plotted in real-time.

31 Claims, 9 Drawing Sheets

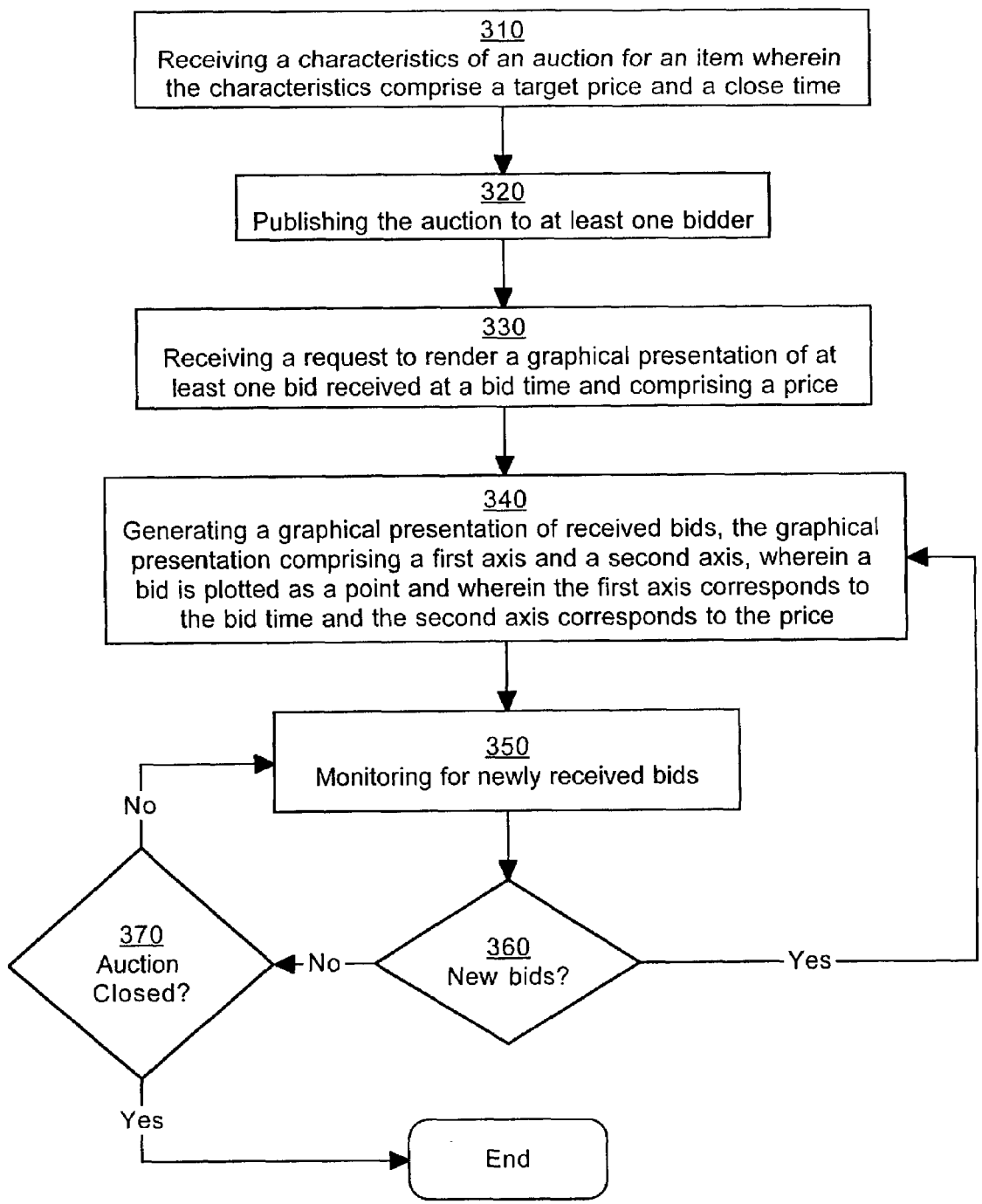

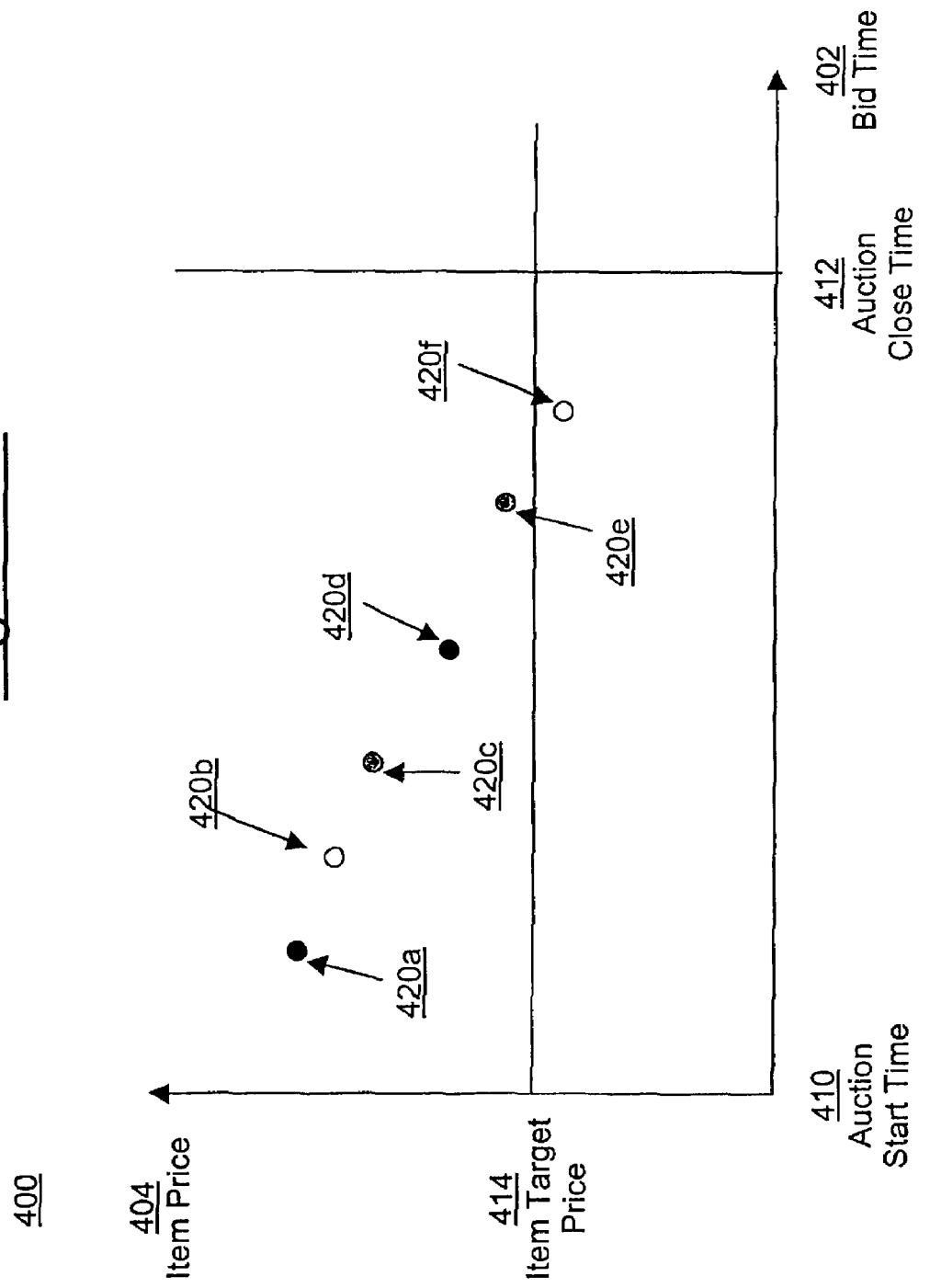

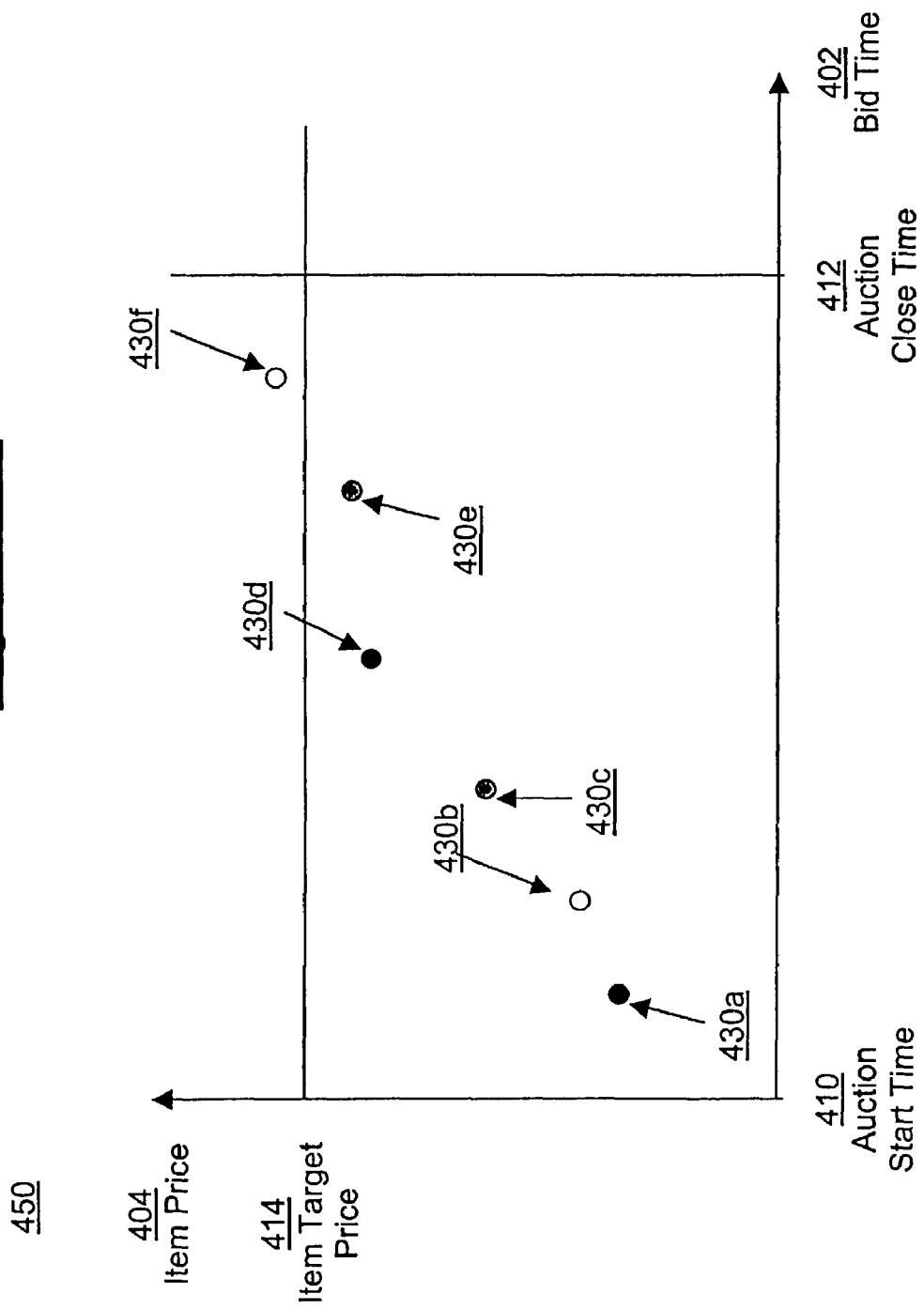

METHOD FOR GRAPHICALLY PRESENTING AUCTION INFORMATION

FIELD OF INVENTION

Embodiments of the present invention pertain to the field of electronic commerce. More particularly, the present invention relates to a method for graphically presenting auction information.

BACKGROUND OF THE INVENTION

Buyers and sellers use a variety of techniques to ensure goods and services meet their mutual expectations. However, traditional procurement systems have been proven to be error prone, labor intensive, and costly operations. For example, often times, when a buyer is looking to purchase a batch of articles, a buyer might negotiate terms for the purchase prior to making the purchasing decision. The negotiation allows the buyer and seller to ensure the articles and terms (e.g., price, quantity, delivery conditions, etc.) will meet any specific requirements. Traditional buying and selling mediums, such as auctions, catalog based purchasing, and selling, and the like, do not always facilitate the most efficient matching of requirements. The recent ascendancy of electronic commerce provides a means of avoiding, or at least reducing, the problems presented by the use of traditional buying and selling mediums.

In many respects, the Internet and the World Wide Web based network technologies have largely eliminated the most labor intensive and costly portions of the buying and selling type commerce operations (e.g., the use of mass mailings, printed specifications, catalogs, updating preprinted product information, etc.). To take advantage of advances in network technology, a variety of electronic commerce facilitating schemes have been developed. One such scheme involved the use of business-to-business buying and selling exchanges implemented on the Internet. The term "electronic commerce" or "e-commerce" originally evolved from remote forms of electronic shopping to mean all aspects of business and market processes enabled by wide area communications networks, namely, the Internet and the World Wide Web based network technologies. E-commerce is a rapidly growing field, and is generally understood to mean doing business on-line or selling and buying products and services through Web (e.g., Internet based) storefronts or through other similar distributed computer networks. In general, electronic commerce is substantially similar to the more traditional catalog based commerce schemes. The business-to-business e-commerce exchanges, or simply "B2B exchanges" have evolved to focus on the specific needs and requirements of buying and selling between businesses.

As the use of B2B exchanges has proliferated, the implementation of electronic commerce auctions has become increasingly common. Auctions are different from traditional catalog based commerce schemes. Auctions generally aggregate buyers or sellers to purchase or sell items/services through the respective submission of competitive bids. Generally, the most competitive bid is designated the winner of the auction. For example, in an auction amongst multiple competing buyers, the most competitive bid is usually the bid offering the most money for the specified item or service. In an auction amongst multiple competing sellers, the most competitive bid is usually the bid offering the specified item or service for the lowest price.

Thus, buyers and sellers participating in an auction compete with one another on the basis of the terms of their bids. Auctioneers have an interest in making the bidding process as competitive as possible to effect the most efficient matching of requirements between sellers and buyers (e.g., getting the best deal). Large numbers of buyers or sellers competitively trying to outbid one another usually leads to the most favorable terms.

Often, the auctioneer desires an understanding of how bidding is progressing in a live auction. This is particularly desirable in auction with a short life span (e.g., 2-24 hours). Auction status information is useful in determining a number of factors. For example, if the bidding activity is lower than desired, the auctioneer may elect to invite additional bidders or extend the auction close time. Alternatively, if the bidding activity has met the auctioneer's goal, the auctioneer may elect to end the auction immediately.

Currently, an auctioneer must access text-based data in order to view bidding information. Typically, the text-based data is difficult to interpret and understand. Furthermore, typical auction data is not provided in real-time. For high-velocity auctions with short run times, it is necessary to be provided with real-time auction data.

SUMMARY OF THE INVENTION

Accordingly, a need exists for a method for providing an easy to comprehend graphical presentation for viewing how bidding activity in an auction is progressing. A need also exists for a method that satisfies the above need, and indicates how far current bidding is from a target price and how much time is left in the auction. A need also exists for a method that satisfies the above needs, and provides a real-time graphical presentation.

A method for graphically presenting auction information is presented. In one embodiment, characteristics of an auction for an item are received, wherein the characteristics comprise a target price for the item and a close time of the auction. The auction is then published to at least one bidder. At least one bid is received at a bid time, wherein the bid comprises a price for the item. In one embodiment, the price is price per unit. In one embodiment, the bid comprises bidder identification.

In another embodiment, characteristics of an auction for an item are received, wherein the characteristics comprise a plurality of attributes for the item. The auction is then published to at least one bidder. At least one bid is received, wherein the bid comprises a price for the item and a value associated with at least one attribute. A composite score for the bid is calculated based on the bid and the characteristics of the auction.

A graphical presentation of status of the auction is generated, presenting auction information. The graphical presentation comprises a first axis and a second axis. In one embodiment, the bid is plotted as a point within the graphical presentation where the first axis corresponds to the bid time and the second axis corresponds to the price. In one embodiment, the bids are plotted in real-time. In another embodiment, the bid is plotted as a point within the graphical presentation where the first axis corresponds to the composite score and the second axis corresponds to the price. In one embodiment the first axis is a horizontal axis and the second axis is a vertical axis.

In one embodiment, the close time is indicated on the graphical presentation as a line intersecting the first axis. In one embodiment, the target price is indicated on the graphical presentation as a line intersecting the second axis. In one embodiment, the bid comprises bidder identification. In one embodiment, provided a plurality of bids are received, a point representing a bid is assigned a color based on the bidder identification. In one embodiment, interacting with the point provides information regarding the bid.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 illustrates a flowchart showing steps in a process for graphically presenting auction information by generating a graphical presentation illustrating price versus bid time in accordance with one embodiment of the present invention.

FIGS. 4A and 4B illustrate exemplary graphical presentations illustrating price versus bid time in accordance with one embodiment of the present invention.

DETAILED DESCRIPTION

Figure 1:
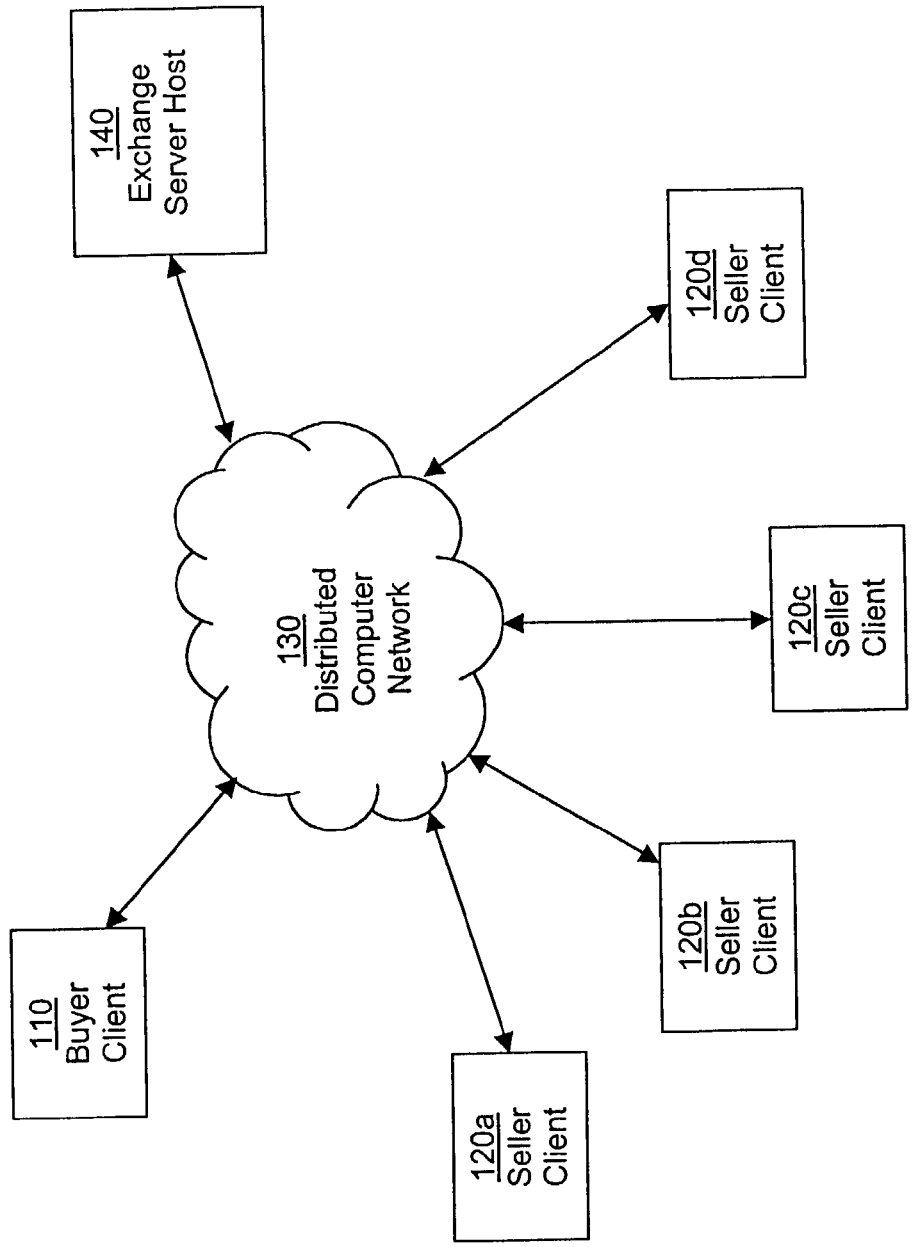
FIG. 1 illustrates a block diagram of an electronic commerce auction operation in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

The present invention provides a method for graphically presenting bidding information in an auction. Embodiments of the present invention provide for generating a graphical presentation of status of the auction, presenting auction information. In one embodiment, the bid is plotted as a point within the graphical presentation where the first axis corresponds to the bid time and the second axis corresponds to the price. In one embodiment, the bids are plotted in real-time. In another embodiment, the bid is plotted as a point within the graphical presentation where the first axis corresponds to the composite score and the second axis corresponds to the price. In one embodiment the first axis is a horizontal axis and the second axis is a vertical axis.

Embodiments of the present invention allow for the organizer of the auction to define an auction by determining attributes of an item and assigning a score based on a value submitted in a bid. Additionally, embodiments of the present invention allow for the organizer of the auction to assign attributes a relative weight with respect to other attributes. Additionally, embodiments of the present invention provide the organizer of the auction with a composite score of the bid as based on the predefined attribute scores and weights.

It should be appreciated that embodiments of the present invention may implement graphically presenting auction information for an item or service in an auction. For purposes of the present application, the term "item" is understood to refer to both items and/or services. Furthermore, embodiments of the present invention also apply to requests for information (RFIs), requests for proposals (RFPs), and requests for quotes (RFQs), as well as auctions. For purposes of the present application, the term "auction" is also understood to refer to RFIs, RFPs and RFQs (collectively RFXs).

Embodiments of the present invention may be directed towards private and public exchanges, wherein private exchanges are scenarios having one auction organizer and many bidders, and wherein public exchanges have many organizers and many bidders. For purposes of simplicity, the present application refers to private exchanges.

Notation and Nomenclature

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "publishing" or "calculating" or "determining" or "totaling" or "ranking" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

A Method for Graphically Presenting Auction Information

Referring now to FIG. 1, a diagram of an electronic exchange auction system 100 in accordance with one embodiment of the present invention is shown. As depicted in FIG. 1, system 100 includes an exchange server host 140 communicatively coupled to a buyer client 110 and a plurality of seller clients 120a-d via a distributed computer network 130. Auction operations in accordance with system 100 are at times referred to as "reverse auctions" or "procurement auctions" where sellers submit competing bids to sell specified products and/or services to a buyer.

The exchange server host 140 functions as the central communications point for the auction operations, by conducting data collection and management of item information (e.g., items, services, or the like) and the auction characteristics provided by buyer clients, such as buyer client 110, and auction bid information provided by the seller clients 120a-d. In one embodiment, exchange server host 140 performs a method for graphically presenting auction information (e.g., process 300 of FIG. 3 or process 500 of FIG. 5). Buyer client 110 and seller clients 120a-d communicate with exchange server host 140 via the communications protocols of distributed computer network 130, hereafter referred to as network 130. Exchange server host 140 conducts the auction operations on the basis of a comparison of the competing bid information from seller clients 120a-d.

A typical auction operation comprises seller clients 120a-d accessing characteristics defining an auction for an item stored on exchange server host 140 by buyer client 110 and submitting competing bids to exchange server host 140 for the item. The bids are transmitted from seller clients 120a-d to exchange host server 140 via network 130. Similarly, the characteristics are provided to exchange server host 140 by buyer client 110 via network 130. Buyer client 110 accesses a graphical presentation of auction status information from exchange server host 140 via network 130. In one embodiment, the present invention provides a graphical representation of auction status through a program applet within a browser of buyer client 110.

It should be noted that the embodiment of the present invention depicted in FIG. 1 (e.g., system 100) is implemented as a software based process cooperatively executing on the respective computer system platforms of both exchange server host 140 and seller clients 120a-d. The basic components of the computer system platforms are shown in the example computer system 800 of FIG. 8 below.

Referring still to FIG. 1, network 130 includes well know network technologies. For example, network 130 can be implemented using LAN technologies (e.g., Ethernet, Token-ring, etc.), the Internet, or other wired or wireless network technologies. The communications links between exchange server host 140, buyer client 110, seller clients 120a-d and network 130 can be implemented using, for example, a telephone circuit, communications cable, optical cable, wireless link, or the like.

Figure 2:
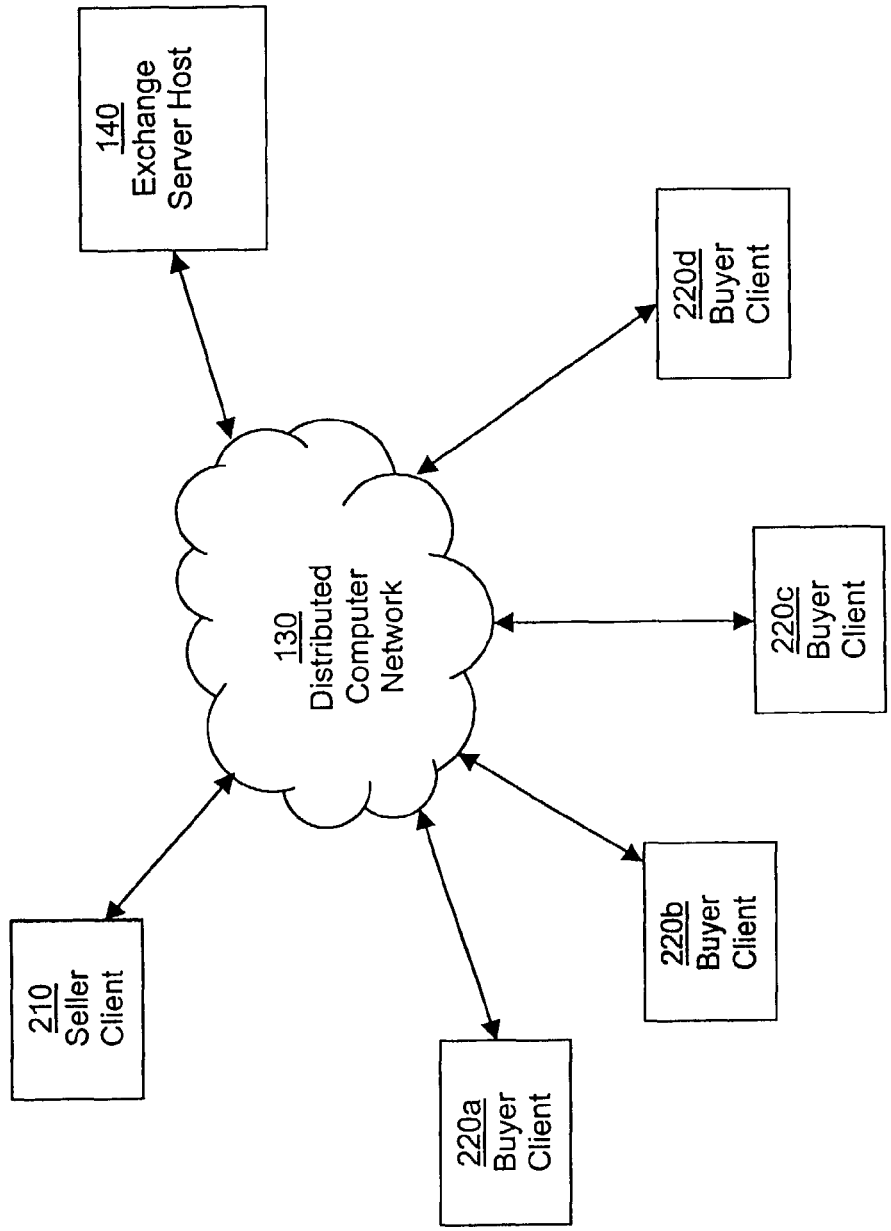
FIG. 2 illustrates a block diagram of an electronic commerce auction operation in accordance with an alternative embodiment of the present invention.

FIG. 2 shows a system 200 in accordance with an alternative embodiment of the present invention. System 200 is substantially similar to system 100 of FIG. 1, however, system 200 depicts an auction operation wherein competing buyer clients 220a-d bid to buy products or services from a seller client 210. Auction operations in accordance with system 200 are at times referred to as "standard auctions" or where buyers submit competing bids to purchase specified items and/or services from a seller.

The auction operation depicted in FIG. 2 comprises buyer clients 220a-d accessing characteristics defining an auction for an item stored on exchange server host 140 by seller client 210 and submitting competing bids to exchange server host 140 in order to buy the specified product or service from seller client 210. In a manner similar to system 100 of FIG. 1, the bids are transmitted from buyer clients 220a-d to exchange host server 140 via network 130, and the specification is provided to exchange server host 140 by seller client 210 via network 130. Seller client 210 accesses a graphical presentation of auction status information from exchange server host 140 via network 130. In one embodiment, the present invention provides a graphical representation of auction status through a program applet within a browser of seller client 210.

FIG. 3 illustrates a flowchart showing steps in a process 300 for graphically presenting auction information by generating a graphical presentation illustrating bid time versus price in accordance with one embodiment of the present invention. In one embodiment, process 300 is carried out by processors and electrical components under the control of computer readable and computer executable instructions. Although specific steps are disclosed in process 300, such steps are exemplary. That is, the embodiments of the present invention are well suited to performing various other steps or variations of the steps recited in FIG. 3. As depicted in FIG. 3, process 300 diagrams the operating process of generating a graphical presentation of auction status information as performed by, for example, system 100 of FIG. 1, as a buyer performs an auction to buy an item from multiple competing sellers.

At step 310 of process 300, characteristics of an auction for an item are received. In one embodiment, the characteristics comprise a target price for the item and a close time of the auction. In one embodiment, the target price is the price per unit.

At step 320, the auction is published to at least one bidder. In one embodiment, the auction is published over a distributed computer network (e.g., distributed computer network 130 of FIGS. 1 and 2). In one embodiment, the auction is published by transmitting an electronic message to potential auction participants. It should be appreciated that the auction can be published in any way intended to appraise potential participants of the existence of the auction.

At step 330, a request to render a graphical presentation of at least one bid is received. In one embodiment, a bid is received from the bidder at a bid time, wherein the bid comprises a price for the item. In one embodiment, the price is price per unit of the item. In one embodiment the bid comprises bidder identification uniquely identifying the bidder. It should be appreciated that the request to render the graphical presentation can be received at any time during the auction or after the auction closes.

At step 340, a graphical presentation of status of the auction is generated for at least one bid. In one embodiment, the graphical presentation comprises a first axis and a second axis. In one embodiment, the first axis is a horizontal axis and the second axis is a vertical axis. In one embodiment, the bid is plotted as a point within the graphical presentation wherein the first axis corresponds to the bid time and the second axis corresponds to the price of the bid. In one embodiment, both the first axis and the second axis are automatically scaled based on the range of data values (e.g., bid time and price) to be plotted for each bid. In one embodiment, the first axis is adjustable to provide better resolution with respect to bid time. For example, the first axis can be adjusted to display time in daily increments, hourly increments, or minute increments.

In one embodiment, the graphical presentation is generated at the computer system transmitting the request of step 330. In one embodiment, the computer system is the auction organizer's computer system. In one embodiment, the bid data is sent from a remote machine (e.g., exchange server host 140 of FIG. 1) through a computer network (e.g., computer network 130 of FIG. 1) to the auction organizer's computer system (e.g., buyer client 110 of FIG. 1).

At step 350, process 300 monitors for newly received bids. At step 360, it is determined whether any new bids have been received. Provided a new bid is received, the new bid is plotted on the graphical presentation. In one embodiment, process 300 returns to step 340. Monitoring for new bids allows for process 300 to generate a real-time graphical representation of the bidding activity in the auction.

Provided a new bid is not received, process 300 proceeds to step 370. At step 370, it is determined whether the auction is closed (e.g., whether the auction close time has passed. Provided the auction is not closed, process 300 continues to monitor for new bids, as shown at step 350. Alternatively, provided the auction is closed, process 300 ends.

FIGS. 4A and 4B illustrate exemplary graphical presentations 400 and 450, respectively, illustrating bid time versus price in accordance with one embodiment of the present invention. In one embodiment, graphical presentations 400 and 450 are presented as applets within a browser of a computer system (e.g., computer system 800 of FIG. 8). FIG. 4A illustrates a graphical presentation 400 of auction status for a procurement auction. Graphical presentation 400 comprises horizontal axis 402 illustrating bid time and vertical axis 404 illustrating item price. Graphical presentation 400 further comprises a plurality of points 420a-f, wherein a point is a graphical representation of a specific bid. As graphical presentation 400 illustrates auction status for a procurement auction, points 420a-f indicate a downward price trend as suppliers compete for a sale.

Auction 410 indicates the starting time of the auction. In one embodiment, the auction close time as specified in the characteristics is indicated on graphical presentation 400 as line 412 intersecting the horizontal axis. In one embodiment, the item target price as specified in the characteristics is indicated on the graphical presentation as line 414 intersecting the second axis.

In one embodiment, each point is assigned a color based on the bidder identification as received in the bid. For example, points 420a and 420d are assigned the same color, indicating that they represent bids made by the same bidder. Similarly, points 420b and 420f are assigned the same color, thus representing bids of the same bidder. Indicating a bidder identity allows for the auction organizer to analyze the bidding patterns of bidders, as well as the overall bidding pattern.

Similarly, FIG. 4B illustrates a graphical presentation 450 of auction status for a forward auction. Graphical presentation 450 comprises horizontal axis 402 illustrating bid time and vertical axis 404 illustrating item price. Graphical presentation 450 further comprises a plurality of points 430a-f, wherein a point is a graphical representation of a specific bid. As graphical presentation 450 illustrates auction status for a forward auction, points 430a-f indicate an upward price trend as buyers compete for an item.

In one embodiment, a user interacting with a point of FIG. 4A or 4B is provided with detailed information regarding the corresponding bid. In one embodiment, a user interacts with a point by dragging a cursor over the point (e.g., by using cursor control device 807 of FIG. 8). In one embodiment, the detailed information comprises the price of the bid, the identity of the bidder, and the time the bid was submitted. It should be appreciated that the detailed information can be any information used to describe the item within the auction, and is not limited to the information described in the present embodiment.

Graphical presentations 400 and 450 provide an auction organizer with detailed information of the status of an auction. Based on the graphical presentation, the auction organizer can easily understand the status of the auction and the bid activity. This information allows the auction organizer to determine a future course of action. For example, if the bidding activity is lower than desired, the auction organizer may elect to invite additional bidders or extend the auction close time. Alternatively, if the bidding activity has met the auction organizer's goal, the auction organizer may elect to end the auction earlier than the original auction close time.

Figure 5:
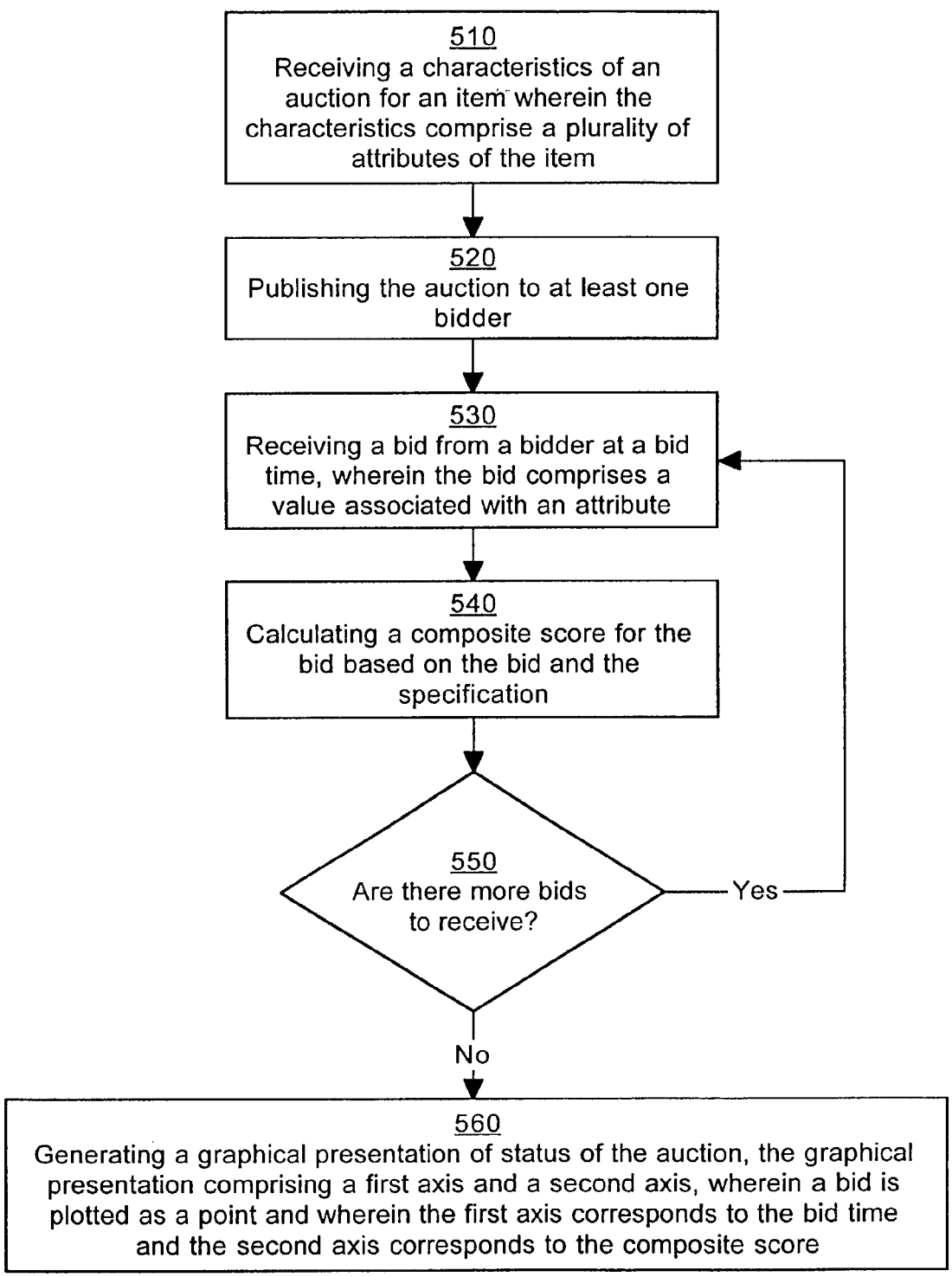
FIG. 5 illustrates a flowchart showing steps in a process for graphically presenting auction information by generating a graphical presentation illustrating price versus composite score in accordance with one embodiment of the present invention.

FIG. 5 illustrates a flowchart showing steps in a process 500 for graphically presenting auction information by generating a graphical presentation illustrating composite score versus price in accordance with one embodiment of the present invention. In one embodiment, process 500 is carried out by processors and electrical components under the control of computer readable and computer executable instructions. Although specific steps are disclosed in process 500, such steps are exemplary. That is, the embodiments of the present invention are well suited to performing various other steps or variations of the steps recited in FIG. 5. As depicted in FIG. 5, process 500 diagrams the operating process of graphically presenting auction information as performed by, for example, system 100 of FIG. 1, as a buyer performs an auction to buy an item from multiple competing sellers.

At step 510, characteristics defining an auction for an item are received. In one embodiment, the characteristics comprise a plurality of attributes of the item. An attribute defines the functionality of an aspect of the item with respect to the current auction. In one embodiment, a person organizing the auction defines the attributes. The auction organizer then determines a value or a range of values with respect to each attribute, and then assigns a score to each value or range of value. In one embodiment, the score ranges from zero to one hundred, with zero being the least desirable and one hundred being the most desirable. In one embodiment, the auction organizer also assigns a relative weight to a portion of the attributes. In one embodiment, the relative weight is a percentage where the greater the percentage assigned to the attribute, the more important the attribute.

At step 520, the auction is published to at least one bidder. In one embodiment, the auction is published over a distributed computer network (e.g., distributed computer network 130 of FIGS. 1 and 2). In one embodiment, the auction is published by transmitting an electronic message to potential auction participants. It should be appreciated that the auction can be published in any way intended to appraise potential participants of the existence of the auction.

In one embodiment, the auction as published includes the attributes and the associated value or range of values and scores for each value or range of values. The present embodiment allows the auction organizer to inform potential participants of the most important attributes and how to submit a desirable bid. In another embodiment, the auction as published includes the attributes, but not the associated value or range of values. The present embodiment allows the auction organizer to keep certain aspects of the auction secret.

Upon receiving the auction as published, a bidder will enter in values for each attribute. As described above, the bidder may or may not be aware of the scores associated with their values as entered.

Figure 6:
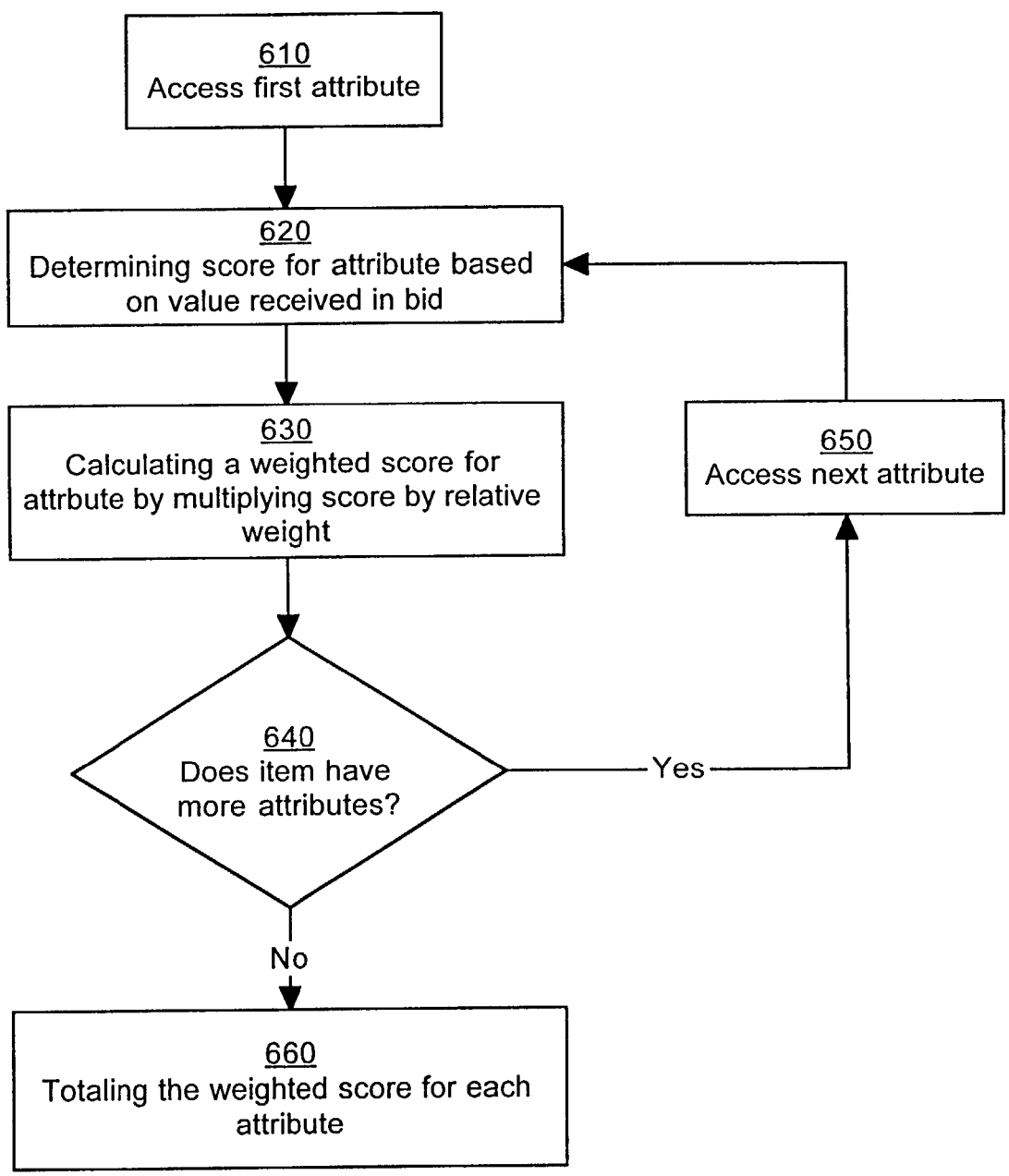
FIG. 6 illustrates a flowchart showing steps in a process for determining a composite score for a bid in accordance with one embodiment of the present invention.

At step 530, a bid from the bidder is received, wherein the bid comprises a value associated with at least one attribute. In one embodiment, the bid comprises a price. At step 540, a composite score is calculated for the bid based on the bid and the specification. FIG. 6 illustrates a flowchart showing steps in a process 600 for determining a composite score for a bid in accordance with one embodiment of the present invention.

At step 610 of FIG. 6, the first attribute for the bid is accessed. At step 620, the score for the attribute is determined based on the value as received in the bid. At step 630, a weighted score for the attribute is calculated by multiplying the score as determined at step 620 by the relative weight. At step 640, it is determined whether the item has any more attributes. Provided there are more attributes that require a weighted score determination, process 600 proceeds to step 650. At step 650, the next attribute is accessed. Process 600 then proceeds to step 620. It should be appreciated that steps 620-640 are repeated for every attribute of the item.

Once all attributes have been accessed, and a weighted score has been determined for each, process 600 proceeds to step 660. At step 660, the weighted score for each attribute is totaled, resulting in the composite score. Once the composite score has been calculated, process 600 proceeds to step 550 of FIG. 5. For additional descriptions regarding determining a composite score for a bid, refer to commonly assigned U.S. Pat. No. 7,401,034, entitled "A METHOD AND SYSTEM FOR IMPLEMENTING ATTRIBUTE-BASED BIDDING AND BID COMPARISON IN AN ELECTRONIC EXCHANGE", issued to Manish Srivastava et al. on Jul. 15, 2008, with filing date Jun. 27, 2002.

At step 550 of FIG. 5A, it is determined whether there are any more bids to receive. Provided there are more bids to receive, process 500 returns to step 530. It should be appreciated that steps 530-550 are repeated for every bid received. Once all bids have been received, process 500 proceeds to step 560. In one embodiment, once the auction has ended, it is determined that all bids have been received.

At step 560, a graphical presentation of status of the auction is generated. In one embodiment, the graphical presentation comprises a first axis and a second axis. In one embodiment, the first axis is a horizontal axis and the second axis is a vertical axis. In one embodiment, the bid is plotted as a point within the graphical presentation wherein the first axis corresponds to the composite score and the second axis corresponds to the price of the bid. It should be appreciated that the graphical presentation may be generated at any time during the auction or after the auction closes. If the graphical presentation is generated during the auction, only the bids received up to that time will be plotted.

Figure 7:
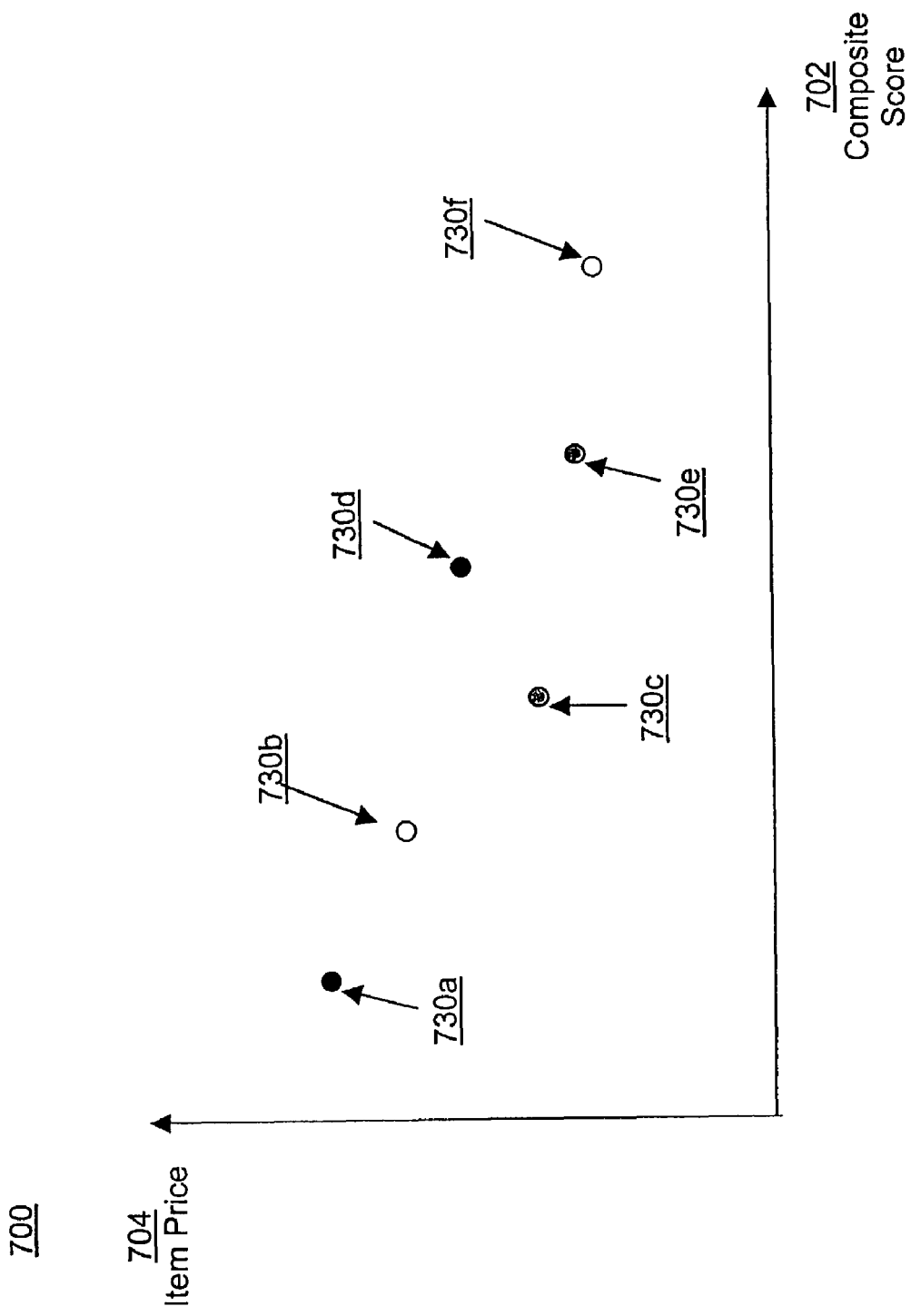
FIG. 7 illustrates an exemplary graphical presentation illustrating composite score versus bid time in accordance with one embodiment of the present invention.

FIG. 7 illustrates an exemplary graphical presentation 700 illustrating bid time versus composite score in accordance with one embodiment of the present invention. In one embodiment, graphical presentation 700 is presented as an applet within a browser of a computer system (e.g., computer system 800 of FIG. 8). Graphical presentation 700 comprises horizontal axis 702 illustrating composite score and vertical axis 704 illustrating item price. Graphical presentation 700 further comprises a plurality of points 730*a-f*, wherein a point is a graphical representation of a specific bid.

In one embodiment, graphical presentation 700 provides an auction organizer with a tool for analyzing the auction upon completion of the auction. In a procurement auction, bids in the lower right of graphical presentation 700 (e.g., bids with a low price and a high composite score) are desirable while those bids in the upper left of graphical presentation 700 (e.g., bids with a high price and a low composite score) are less desirable.

In one embodiment, each point is assigned a color based on the bidder identification as received in the bid. For example, points 730*a* and 730*d* are assigned the same color, indicating that they represent bids made by the same bidder. Similarly, points 730*b* and 730*f* are assigned the same color, thus representing bids of the same bidder. Indicating a bidder identity allows for the auction organizer to analyze the bidding patterns of bidders, as well as the overall bidding pattern.

Figure 8:
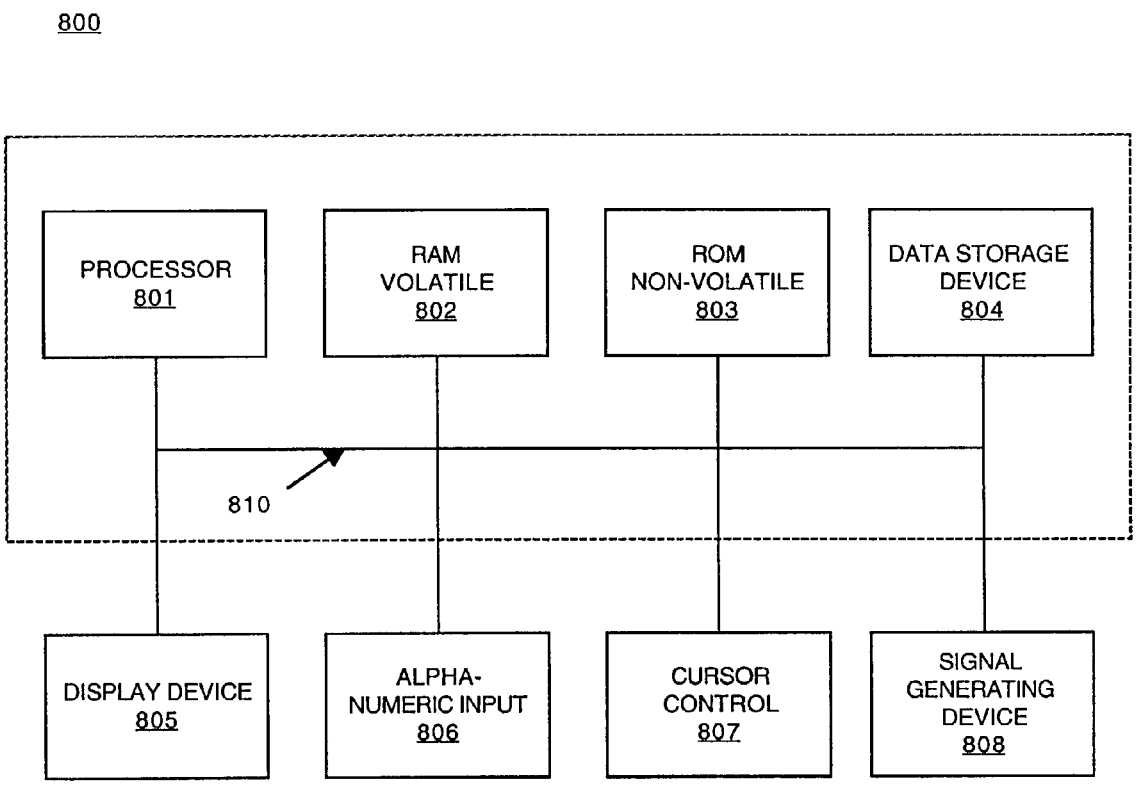
FIG. 8 illustrates a block diagram of an exemplary computer system upon which embodiments of the present invention may be implemented.

Exemplary Hardware Upon which Embodiments of the Present Invention May be Implemented Portions of the present invention are comprised of computer-readable and computer executable instructions which reside, for example, in computer-usable media of a computer system. FIG. 8 illustrates a block diagram of an exemplary computer system 800 upon which embodiments of the present invention may be implemented. Computer system 800 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 800) and are executed by the processor(s) of system 800. When executed, the instructions cause the computer system 800 to implement the functionality of the present invention as described above.

In general, computer system 800 shows the basic components of a computer system used to implement "server" machines and "client" machines. Computer system 800 comprises an address/data bus 810 for communicating information, one or more central processors 801 coupled with the bus 810 for processing information and instructions, a computer readable volatile memory unit 802 (e.g., random access memory, static RAM, dynamic, RAM, etc.) coupled with the bus 810 for storing information and instructions for the central processor(s) 801, a computer readable non-volatile memory unit 803 (e.g., read only memory, programmable ROM, flash memory, EPROM, EEPROM, etc.) coupled with the bus 810 for storing static information and instructions for the processor(s) 801. System 800 also includes a computer readable data storage device 804 such as a magnetic or optical disk and disk drive coupled with the bus 810 for storing information and instructions. Optionally, system 800 can include a display device 805 coupled to the bus 810 for displaying information to the computer user, an alphanumeric input device 806 including alphanumeric and function keys coupled to the bus 810 for communicating information and command selections to the central processor(s) 801, a cursor control device 807 coupled to the bus for communicating user input information and command selections to the central processor(s) 801, and a signal generating device 808 coupled to the bus 810 for communicating command selections to the processor(s) 801.

The preferred embodiment of the present invention, a method and system implementing attribute-based bidding in an electronic exchange, is thus described. While the present invention has been described in particular embodiments, it should be appreciated that the present invention should not be construed as limited by such embodiments, but rather construed according to the below claims.

What is claimed is:

1. A computer-implemented method for graphically presenting auction information, said method comprising:
   receiving characteristics of an auction for an item from an organizer of the auction, said characteristics comprising a plurality of attributes of said item provided by the auction organizer;
   publishing said auction from an auction server to at least one bidder, the published auction listing the plurality of item attributes and an indication of the relative weight of each attribute in a composite score as specified by the auction organizer;
   receiving a plurality of bids at the auction server, each received bid comprising a price for said item, an identification of a bidder submitting the bid, and a value associated with at least one said attribute;
   calculating the composite score for said bid based on said bid and said characteristics;
   assigning a color to each bid based upon the bidder identification of the bid, each assigned color being unique to a single bidder identification;
   generating a graphical presentation of status of said auction, said graphical presentation comprising a first axis and a second axis, wherein each received bid is plotted as a point within said graphical presentation having the color assigned to the bidder identification of the bid, wherein said first axis corresponds to said composite score and said second axis corresponds to said price;
   receiving an indication of user interaction with a first one of the plotted points; and
   responsive to the user interaction, providing additional information regarding the bid plotted as the first one of the plotted points.

2. The method as recited in claim 1 wherein said first axis is a horizontal axis and said second axis is a vertical axis.

3. The method as recited in claim 1, wherein each composite score is not equal to the price in the bid from which it is calculated.

4. The method as recited in claim 1, wherein each of said plurality of bids comprises a value associated with each of said plurality of attributes.

5. The method as recited in claim 1, wherein the bidder is a seller of the item, said method further comprising providing the graphical presentation to a buyer of the item.

6. The method as recited in claim 1, wherein the bidder is a buyer of the item, said method further comprising providing the graphical presentation to a seller of the item.

7. The method as recited in claim 1, further comprising the step of receiving a request to generate the graphical presentation after the auction closes, wherein the step of generating the graphical presentation is performed in response to the request.

8. The method as recited in claim 1, wherein the step of generating the graphical presentation is performed by the auction server.

9. The method as recited in claim 1, further comprising:
   receiving a value or a range of values for each of the plurality of attributes from the auction organizer; and
   receiving a score for each value or range of values from the auction organizer, the received score indicating the relative weight of the associated attribute.

10. The method as recited in claim 9, wherein the relative weight of each attribute is a percentage rating provided by the auction organizer.

11. A computer-readable medium having computer-readable program code embodied therein for causing a computer system to perform a method for graphically presenting auction information, said method comprising:
   receiving characteristics of an auction for an item from an organizer of the auction, said characteristics comprising a plurality of attributes of said item provided by the auction organizer;
   publishing said auction from an auction server to at least one bidder, the published auction listing the plurality of item attributes and an indication of the relative weight of each attribute in a composite score as specified by the auction organizer;
   receiving a plurality of bids at the auction server, each received bid comprising a price for said item, an identification of a bidder submitting the bid, and a value associated with at least one said attribute;
   calculating the composite score for said bid based on said bid and said characteristics;
   assigning a color to each bid based upon the bidder identification of the bid, each assigned color being unique to a single bidder identification;
   generating a graphical presentation of status of said auction, said graphical presentation comprising a first axis and a second axis, wherein each received bid is plotted as a point within said graphical presentation having the color assigned to the bidder identification of the bid, wherein said first axis corresponds to said composite score and said second axis corresponds to said price;
   receiving an indication of user interaction with a first one of the plotted points; and
   responsive to the user interaction, providing additional information regarding the bid plotted as the first one of the plotted points.

12. The computer-readable medium as recited in claim 11 wherein said first axis is a horizontal axis and said second axis is a vertical axis.

13. The computer-readable medium as recited in claim 11, wherein each composite score is not equal to the price in the bid from which it is calculated.

14. The computer-readable medium as recited in claim 11, wherein each of said plurality of bids comprises a value associated with each of said plurality of attributes.

15. The computer-readable medium as recited in claim 11, wherein the bidder is a seller of the item, said method further comprising providing the graphical presentation to a buyer of the item.

16. The computer-readable medium as recited in claim 11, wherein the bidder is a buyer of the item, said method further comprising providing the graphical presentation to a seller of the item.

17. The computer-readable medium as recited in claim 11, further comprising the step of receiving a request to generate the graphical presentation after the auction closes, wherein the step of generating the graphical presentation is performed in response to the request.

18. The computer-readable medium as recited in claim 11, wherein the step of generating the graphical presentation is performed by the auction server.

19. The computer-readable medium as recited in claim 11, further comprising:
   receiving a value or a range of values for each of the plurality of attributes from the auction organizer; and
   receiving a score for each value or range of values from the auction organizer, the received score indicating the relative weight of the associated attribute.

20. The computer-readable medium as recited in claim 19, wherein the relative weight of each attribute is a percentage rating provided by the auction organizer.

21. A system comprising:
- a processor;
- a computer-readable storage medium in communication with the processor, said medium storing a plurality of instructions to cause the processor to:
    - receive characteristics of an auction for an item from an organizer of the auction, said characteristics comprising a plurality of attributes of said item provided by the auction organizer;
    - publish said auction from an auction server to at least one bidder, the published auction listing the plurality of item attributes and an indication of the relative weight of each attribute in a composite score as specified by the auction organizer;
    - receive a plurality of bids at the auction server, each received bid comprising a price for said item, an identification of a bidder submitting the bid, and a value associated with at least one said attribute;
    - calculate the composite score for said bid based on said bid and said characteristics;
    - assign a color to each bid based upon the bidder identification of the bid, each assigned color being unique to a single bidder identification;
    - generate a graphical presentation of status of said auction, said graphical presentation comprising a first axis and a second axis, wherein each received bid is plotted as a point within said graphical presentation having the color assigned to the bidder identification of the bid, wherein said first axis corresponds to said composite score and said second axis corresponds to said price;
    - receive an indication of user interaction with a first one of the plotted points; and
    - responsive to the user interaction, provide additional information regarding the bid plotted as the first one of the plotted points; and
- an output to provide the graphical presentation to the user of the system.

22. The system as recited in claim 21, the instructions further to cause the processor to:
- receive a value or a range of values for each of the plurality of attributes from the auction organizer; and
- receive a score for each value or range of values from the auction organizer, the received score indicating the relative weight of the associated attribute.

23. The system as recited in claim 22, wherein the relative weight of each attribute is a percentage rating provided by the auction organizer.

24. The system as recited in claim 22, wherein said first axis is a horizontal axis and said second axis is a vertical axis.

25. The system as recited in claim 22, wherein each composite score is not equal to the price in the bid from which it is calculated.

26. The system as recited in claim 22, wherein each of said plurality of bids comprises a value associated with each of said plurality of attributes.

27. The system as recited in claim 22, wherein the bidder is a seller of the item, said method further comprising providing the graphical presentation to a buyer of the item.

28. The system as recited in claim 22, wherein the bidder is a buyer of the item, said method further comprising providing the graphical presentation to a seller of the item.

29. The system as recited in claim 22, further comprising the step of receiving a request to generate the graphical presentation after the auction closes, wherein the step of generating the graphical presentation is performed in response to the request.

30. The system as recited in claim 22, wherein the step of generating the graphical presentation is performed by the auction server.

31. The system as recited in claim 30, wherein the relative weight of each attribute is a percentage rating provided by the auction organizer.

* * * * *

UNITED STATES PATENT AND TRADEMARK OFFICE
CERTIFICATE OF CORRECTION

PATENT NO. : 7,870,037 B2  Page 1 of 1
APPLICATION NO. : 10/185188
DATED : January 11, 2011
INVENTOR(S) : Dave Stephens et al.

It is certified that error appears in the above-identified patent and that said Letters Patent is hereby corrected as shown below:

Sheet 7 of 9, in Figure 6, Box 630, line 2, delete "attrbute" and insert -- attribute --, therefor.

In column 7, line 21, delete "passed." and insert -- passed). --, therefor.

Signed and Sealed this
Thirteenth Day of September, 2011

David J. Kappos
*Director of the United States Patent and Trademark Office*